US010003622B1

(12) United States Patent
Troester et al.

(10) Patent No.: US 10,003,622 B1
(45) Date of Patent: Jun. 19, 2018

(54) ESTABLISHING COMMUNICATION SESSIONS

(71) Applicant: International Business Machines Corporation, Armonk, NY (US)

(72) Inventors: Martin Troester, Renningen (DE); Janna Troester, Renningen (DE); Thomas Pohl, Weil im Schoenbuch (DE); Bernd Simmet, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/841,931

(22) Filed: Dec. 14, 2017

Related U.S. Application Data (63) Continuation of application No. 15/631,084, filed on Jun. 23, 2017.

(51) Int. Cl.
  *H04M 7/00* (2006.01)
  *H04L 29/06* (2006.01)
  *H04L 29/08* (2006.01)

(52) U.S. Cl.
  CPC ........ *H04L 65/403* (2013.01); *H04L 65/1069* (2013.01); *H04L 67/14* (2013.01);
  (Continued)

(58) Field of Classification Search
  CPC ............... H04L 65/403; H04L 65/1069; H04L 65/1073; H04L 67/18; H04L 67/14; H04L 29/12896; H04L 51/066; H04M 7/0003; H04M 7/0006; H04M 7/006; H04M 7/0012; H04M 7/0027; H04M 7/0024;
  (Continued)

(56) References Cited

U.S. PATENT DOCUMENTS 6,320,534 B1 11/2001 Goss
7,013,003 B2 3/2006 Seligmann
(Continued)

FOREIGN PATENT DOCUMENTS

WO 2015028936 A1 3/2015

OTHER PUBLICATIONS

Cisco, "Enterprise Mobility 4.1 Design Guide," Chapter: Cisco Unified Wireless Location-Based Services, Updated Oct. 31, 2013, 10 pages.

(Continued)

*Primary Examiner* — Le H Luu
(74) *Attorney, Agent, or Firm* — Nicholas D. Bowman (57) ABSTRACT

A method and a system for establishing a communication session between a first communication device in a main communication network and a second communication device in a local communication network comprising a wireless network, the second communication device being located in the vicinity of a mobile device, the first communication device contacting an external phone number, wherein the external phone number is assigned to a unique identifier of the mobile device. The method comprises (i) the mobile device sending the unique identifier detectable on the wireless network; (ii) providing the unique identifier of the mobile device) and a local communication identifier to a service provider adapter; (iii) determining the location of the mobile device, associating the mobile device to the second communication device in dependence of its location.

1 Claim, 6 Drawing Sheets

(52) U.S. Cl.
CPC .............. *H04L 67/18* (2013.01); *H04M 7/00* (2013.01); *H04M 7/0003* (2013.01); *H04M 7/006* (2013.01); *H04M 7/0006* (2013.01); *H04M 7/0012* (2013.01); *H04M 7/0024* (2013.01); *H04M 7/0027* (2013.01)

(58) Field of Classification Search
CPC ......... H04M 3/42008; H04M 3/42093; H04M 3/42212; H04M 3/4228; G06F 17/30035; G06F 17/3053; H04W 24/08; H04W 4/02
See application file for complete search history.

(56) References Cited

U.S. PATENT DOCUMENTS

| | | | |
|---|---|---|---|
| 7,769,392 | B2 | 8/2010 | Russell |
| 8,995,948 | B2 | 3/2015 | Walker et al. |
| 2011/0237263 | A1 | 9/2011 | Couse |
| 2013/0023247 | A1* | 1/2013 | Bolon .................. H04W 24/08 455/414.1 |
| 2013/0040624 | A1 | 2/2013 | Taboada |
| 2013/0225205 | A1* | 8/2013 | Haney ................. H04M 3/4228 455/456.3 |
| 2013/0304581 | A1* | 11/2013 | Soroca ............. G06F 17/30035 705/14.64 |
| 2014/0065997 | A1* | 3/2014 | Walker ................... H04W 4/02 455/404.1 |
| 2014/0162597 | A1* | 6/2014 | Chau ................. H04M 3/42008 455/406 |
| 2015/0245184 | A1 | 8/2015 | Govande et al. |
| 2016/0072955 | A1* | 3/2016 | Barkan ............. H04M 3/42212 455/417 |
| 2016/0191708 | A1* | 6/2016 | Bailey ................ H04N 3/42093 455/414.1 |
| 2016/0241719 | A1* | 8/2016 | Kahn .................. H04L 65/1073 |
| 2016/0255041 | A1* | 9/2016 | Lew .................. H04L 29/12896 709/206 |
| 2017/0075894 | A1* | 3/2017 | Poornachandran . G06F 17/3053 |
| 2017/0149707 | A1* | 5/2017 | Hattar ................... H04L 51/066 |
| 2017/0163811 | A1 | 6/2017 | Barkan |

OTHER PUBLICATIONS

Cisco, "Cisco Unified Wireless Location-Based Services," Chapter 13, printed Jun. 21, 2017, 16 pages.
Cisco, "Meraki: Location Analytics (CMX)," printed Jun. 21, 2017, 23 pages.
One Call, "Your Smart Phone Just Got Smarter," printed Jun. 21, 2017, 1 page.
Smart Call Forwarding, "Smart Call Forwarding—Android Apps on Google Play," printed Jun. 21, 2017, 3 pages.
Unknown, partial machine translation of "Wie lauten die Steuercodes für mein Handy, urn z. B. eine Rufumleitung zu aktivieren oder aufzuheben?," printed Jun. 21, 2017, partial translation of p. 2, full translation of p. 3, and partial translation of p. 4 of 12 pages total.
Troester et al., "Establishing Communication Sessions", U.S. Appl. No. 15/631,084, filed Jun. 23, 2017.
Troester et al., "Establishing Communication Sessions", U.S. Appl. No. 15/803,974, filed Nov. 6, 2017.
IBM, List of IBM Patents or Patent Applications Treated as Related, Dec. 12, 2017, 2 pages.

* cited by examiner

ESTABLISHING COMMUNICATION SESSIONS

BACKGROUND

The present invention relates in general to communication systems, and in particular, to a method, a system as well as a computer program product and a data processing system for establishing a communication session between a first communication device in a main communication network and a second communication device in a local communication network comprising a wireless network.

Mobile devices or wireless communications device are ubiquitous. Because so many people now carry mobile devices with them at all times, at least when away from home, it is often assumed that a mobile subscriber can always be reached by simply calling the number associated with the mobile device. However, the mobile subscriber may be unavailable due to any one of a number of reasons. For example, the device may be shut off, there may be no wireless coverage, the phone may be muted, etc. In such instances, it may not be possible to reach the mobile subscriber, which may be highly problematic, especially in emergency cases.

Network integration applications supporting call routing between wireless and wireline telephones for single end users typically provide one or more service capabilities such as call forwarding and Find Me-Follow Me® services. The Find Me-Follow Me® service provides end-users with a capability to manage communications by allowing them to determine how, when, and by whom they can be reached.

Find Me-Follow Me® service applications enable users to define profiles based on a wide variety of parameters via a telephone or a Web-based interface. Typically, users select a combination of different phone numbers in a user defined search order for delivery of calls. For example, users who are going to be away from the office can set preferences that enable the system to first transfer important calls to a mobile phone number, then a pager, and then home if no one answers at the office. Generally, if no pick up occurs at the final destination, the caller can be transferred to voicemail.

SUMMARY

A method is proposed for establishing a communication session between a first communication device in a main communication network and a second communication device in a local communication network comprising a wireless network, the second communication device being located in the vicinity of a mobile device assigned to a call receiver, the first communication device contacting an external phone number, wherein the external phone number is assigned to a unique identifier of the mobile device by a service provider connected to the main communication network. The method comprises (i) the mobile device sending the unique identifier detectable on the wireless network; (ii) providing the unique identifier of the mobile device and a local communication identifier to a service provider adapter of the service provider; (iii) in response to the detection of the unique identifier in the wireless network, determining the location of the mobile device, associating the mobile device to the second communication device in dependence of its location; and (iv) generating a unique temporary local network identifier at the service provider adapter, to register and authenticate the call receiver at a local network adapter. The second communication device is reachable via the external phone number from the main communication network via a communication channel using the local communication identifier and the temporary local network identifier.

The invention could provide a solution to contact the call receiver who may possess a mobile device like a smartphone in emergency cases when the smartphone is not reachable via the mobile phone service or via internet. Such emergency cases may for example be call home situations for a child, e.g. an accident in the kindergarten.

A common situation in which the user of the mobile device is not reachable via standard connectivity such as GSM (global system for mobile communication), VoIP (Voice over IP), LTE (long term evolution)) may be physical absence of network connectivity, e.g. in a basement meeting room. In addition, wireless local area network (WLAN) infrastructure access may be prohibited.

The user of the smartphone could be reached while being outside of mobile phone service reach (GSM, LTE) as long as he is in reach of a WLAN infrastructure, without needing access permissions of this WLAN infrastructure. In such case, a call to his or her smartphone number is forwarded to an existing phone near the location of the smartphone. The call receiver may remain anonymous in the phone network.

A central service is established which manages a unique external phone number. Each specific site which supports this method accepts forwarding calls to a telephone near the user's exact current location.

The advantage over existing solutions is that a user may only needs to register in the central service. It could work in cases where the current location's infrastructure supports a call forwarding service, without the need to actively entering the WLAN network of the current location, thus avoiding security threats due to non-authorized devices in the WLAN network. It works transparently for the external caller.

Further a system is proposed for establishing a communication session between a first communication device in a main communication network and a second communication device in a local communication network, the second communication device being located in the vicinity of a mobile device assigned to a call receiver, the first communication device contacting an external phone number, wherein the external phone number is assigned to a unique identifier of the mobile device by a service provider connected to the main communication network. The system comprises at least (i) the main communication network with a service provider facility enclosing a service provider adapter and a lookup table; and (ii) the local communication network with a local network adapter, a wireless network, a location detection device and a local lookup table. The main communication network is capable of establishing a communication channel to the local communication network.

Further a favourable computer program product is proposed for establishing a communication session between a first communication device in a main communication network and a second communication device in a local communication network comprising a wireless network, the second communication device being located in the vicinity of a mobile device assigned to a call receiver, the first communication device contacting an external phone number, wherein the external phone number is assigned to a unique identifier of the mobile device by a service provider connected to the main communication network, the computer program product comprising a computer readable storage medium having program instructions embodied therewith, the program instructions executable by the computer to cause the computer to perform a method comprising, (i) the mobile device sending the unique identifier detectable on the wireless network; (ii) providing the unique identifier of the mobile device and a local communication identifier to a service provider adapter of the service provider; (iii) in response to the detection of the unique identifier in the wireless network, determining the location of the mobile device, associating the mobile device to the second communication device in dependence of its location; and (iv) generating a unique temporary local network identifier at the service provider adapter, to register and authenticate the call receiver at a local network adapter, wherein the second communication device is reachable via the external phone number from the main communication network via a communication channel using the local communication identifier and the temporary local network identifier.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments provide a system for establishing a communication session between a first communication device in a main communication network and a second communication device in a local communication network comprising a wireless network, the second communication device being located in the vicinity of a mobile device assigned to a call receiver, the first communication device contacting an external phone number, wherein the external phone number is assigned to a unique identifier of the mobile device by a service provider connected to the main communication network.

The illustrative embodiments are sometimes described herein using particular technologies only as an example for the clarity of the description. The illustrative embodiments may be used for (i) the mobile device sending the unique identifier detectable on the wireless network; (ii) providing the unique identifier of the mobile device and a local communication identifier to a service provider adapter of the service provider; (iii) in response to the detection of the unique identifier in the wireless network, determining the location of the mobile device, associating the mobile device to the second communication device in dependence of its location; and (iv) generating a unique temporary local network identifier at the service provider adapter, to register and authenticate the call receiver at a local network adapter, wherein the second communication device is reachable via the external phone number from the main communication network via a communication channel using the local communication identifier and the temporary local network identifier.

Figure 1:
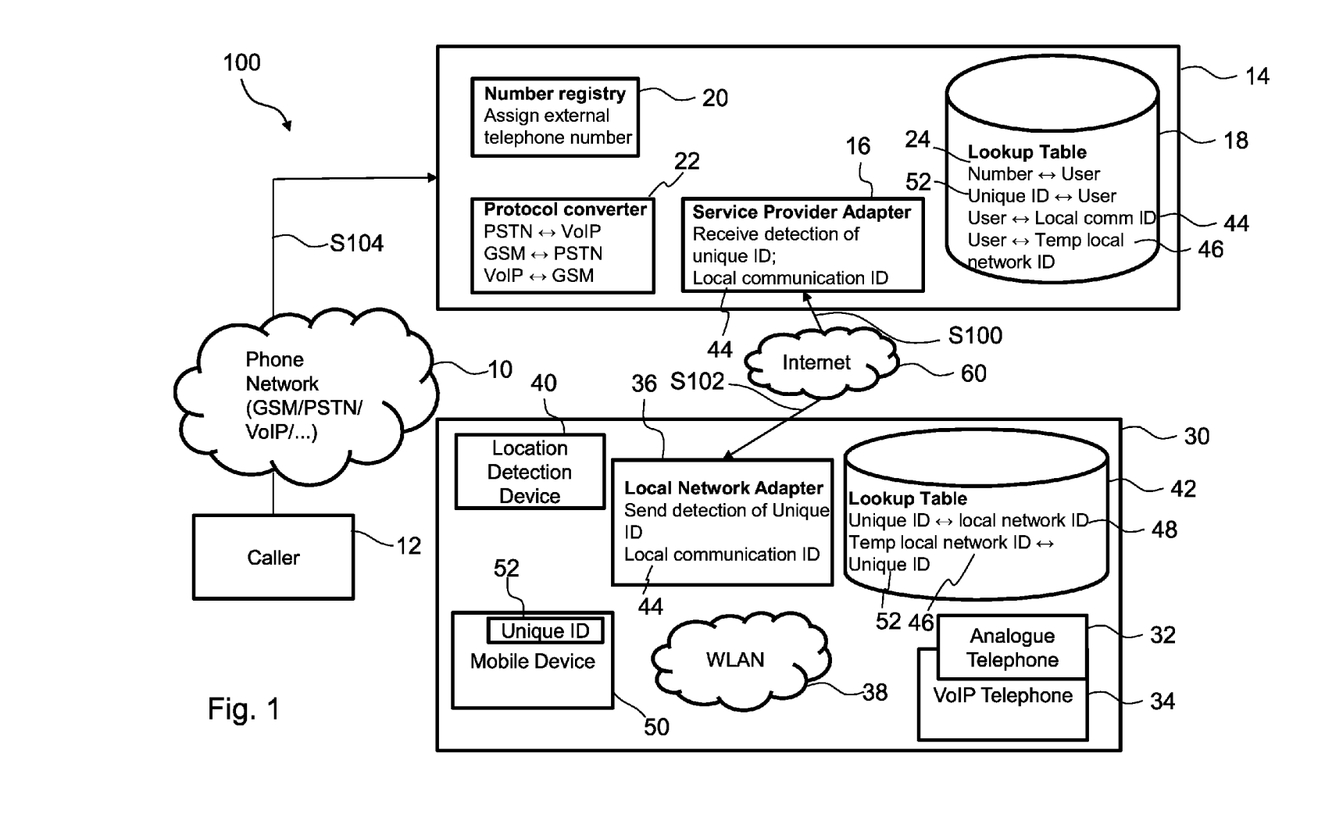
FIG. 1 depicts a block diagram of a system according to an embodiment of the invention for establishing a communication session between a first communication device in a main communication network and a second communication device in a local communication network comprising a wireless network.

FIG. 1 depicts a block diagram of a system 100 according to an embodiment of the invention for establishing a communication session between a first communication device 12 in a main communication network 10 and a second communication device 32 in a local communication network 30 comprising a wireless network 38.

The system 100 is configured for establishing a communication session between a first communication device 12 and a second communication device 32, wherein the second communication device 32 is located in the vicinity of a mobile device 50 assigned to the call receiver. The system 100 comprises the main communication network 10 with a service provider facility 14 enclosing a service provider adapter 16 and a lookup table 18 as well as a number registry 20 and a protocol converter 22.

The first communication network 10 may be a usual phone network of, e.g., GSM, PSTN (public switched telephone network), VoIP standard, and the like. The service provider facility 14 may be connected to the communication network 10 via connection S104 or be comprised within the network 10.

The protocol converter 22 of the service provider facility 14 provides conversion of the different telephone protocols which may be used in the first communication network 10 and in the local phone infrastructure of the local communication network 30.

The number registry 20 provides an assignment of an external phone number 24 to a user of a mobile device 50 like a smartphone by assigning the external phone number 24 to a unique identifier 52 of the mobile device 50. This external phone number 24 does not correspond to the normal phone number of his mobile device 50, but serves as an alternative for reaching the user without having to know the phone number of his mobile phone. The external phone number 24 is therefore not functionally connected to the phone number of the mobile device 50, but attributed for emergency cases, e.g., wherein the mobile device 50 may not be reached via standard phone networks or WLAN networks.

The system further comprises at least one local communication network 30 with a local network adapter 36, a wireless network 38, a location detection device 40 and a local lookup table 42.

The main communication network 10 is capable of establishing a communication channel to the local communication network 30 via Internet 60.

The mobile device 50, which may particularly be a mobile telephone device, particularly for a wireless phone network, and preferably a smartphone device, is registered for use in the first communication network 10, but may be temporarily out of range of the first communication network 10, because the wireless network service as a GSM or LTE service may be down or the mobile device may be located in an area without any coverage of such network services, for example in the basement of a building. Yet, the mobile device 50 is within the range of the local communication network 30. The mobile device 50 is able to send the unique identifier 52, which may be represented as a media access control (MAC) address attributed to the mobile device 50, e.g. as part of the wireless network adapter of the mobile device 50, to the wireless network 38 of the local communication network 30, without the requirement of being connected into the wireless network 38 itself. The wireless network 38 receives the unique identifier 52. The unique identifier 52 may be a beacon, which routinely is broadcasted by mobile phones. This wireless network may be a WLAN network as commonly used in many locations.

A location detection device 40 may be coupled to the wireless network 38 for detecting the location of the mobile device 50 by receiving the unique identifier 52 of the mobile device 50.

The system 100 is further configured to detect the unique identifier 52 of the mobile device 50 on the wireless network 38 by the location detection device 40 which delivers the information to the local network adapter 36. The local network adapter 36 then provides the unique identifier 52 of the mobile device 50 and a local communication identifier 44 to the service provider adapter 16 of the main communication network 10 via the Internet connection 60, e.g., exemplified in FIG. 1 by signal S100. The location detection device 40 is configured, in response to the detection of the unique identifier 52 in the wireless network 38, to determine the location of the mobile device 50, and associate the mobile device 50 to the second communication device 32 in dependence of its location. This information is stored in the local lookup table 42.

According to the inventive method the second communication device 32 is thus reachable via the external phone number 24 from the main communication network 10 via a communication channel using the local communication identifier 44.

The method further comprises that, in response to a request to establish a communication session from the first communication device 12 to the second communication device (32) by contacting the external phone number 24, it is determined if the local communication identifier 44 for the unique identifier 52 was received by the service provider adapter 16. Then a communication session may be established with the second communication device 32 in vicinity of the mobile device 50 via the local communication network 30, if the local communication identifier 44 was received.

The service provider adapter 16, upon receiving the unique identifier 52 and the local communication identifier 44, may provide the external phone number 24 assigned to the unique identifier 52 and generate the temporary local network identifier 46 based on the local communication identifier 44 for establishing the communication channel to the local communication network 30. Then the service provider adapter 16 may provide the temporary local network identifier 46 assigned to the unique identifier 52 to the local network adapter 36 of the local communication network 30 via Internet 60, exemplified by signal S102. The local network adapter 36 of the local communication network 30 determines the second communication device 32 depending on a current location of the mobile device 50. The local network adapter 36 assigning the temporary local network identifier 46 to a local network identifier 48 for connecting the closest secondary communication device (32) depending on a current location of the mobile device (50). Thus a phone call from the first communication device 12 using the external phone number 24 may be routed through the service provider adapter 16 via the local network adapter 36 to the second communication device 32, with the call receiver on the second communication device 32 remaining anonymous.

Associating the mobile device 50 to the second communication device 32 may be performed by locating the unique identifier 52 by the location detection device 40 coupled to the wireless network 38.

Advantageously the local network adapter 36 may forward unique identifiers 52 to the service provider adapter 16 for selected, in particular for preregistered, mobile devices 50 only. By this embodiment it may be selected which unique identifiers 52 of mobile devices 50 are reachable via the local communication network 30 such that, e.g., mobile devices 50 which are in the range of the local communication network 30 by chance only may be excluded from that service.

Further, a cryptographic hash function may advantageously be used in the local communication network 30 and/or the main communication network 10 to anonymize the unique identifier 52. Favourably the service of being reachable by the external phone number 24 may be an anonymous service only, such that the user may not be recognizable to the local communication network.

A protocol converter 22 may advantageously be used in the local communication network 30 as well as in the first communication network 10 and/or the service provider facility 14 to convert different telephone protocols.

Advantageously the unique identifier 52 of the mobile device 50 may be preassigned to the local communication identifier 44, such that the service forwarding a phone call to the external phone number 24 to the second communication device 32 in the vicinity of the mobile device 50 may be selectable for preregistered users only. By this embodiment the service offered by the local communication network 30 may be for restricted use only.

Assignments of the external phone number 24 to the user, the unique identifier 52 to the user, the local communication identifier 44 to the user as well as the temporary local network identifier 46 may advantageously be stored in the lookup table 18 enclosed in the service provider facility 14.

Assignments of the unique identifier 52 to the closest phone, identified by the local network identifier 48, as well as the temporary local network identifier 46 may advantageously be stored in the lookup table 42 connected to the local communication network 30.

The second communication device 32 may be implemented in any different telephone network technology, connected to a VoIP telephone system 34 via the protocol converter 22, such as an analogue telephone 32.

Figure 2:
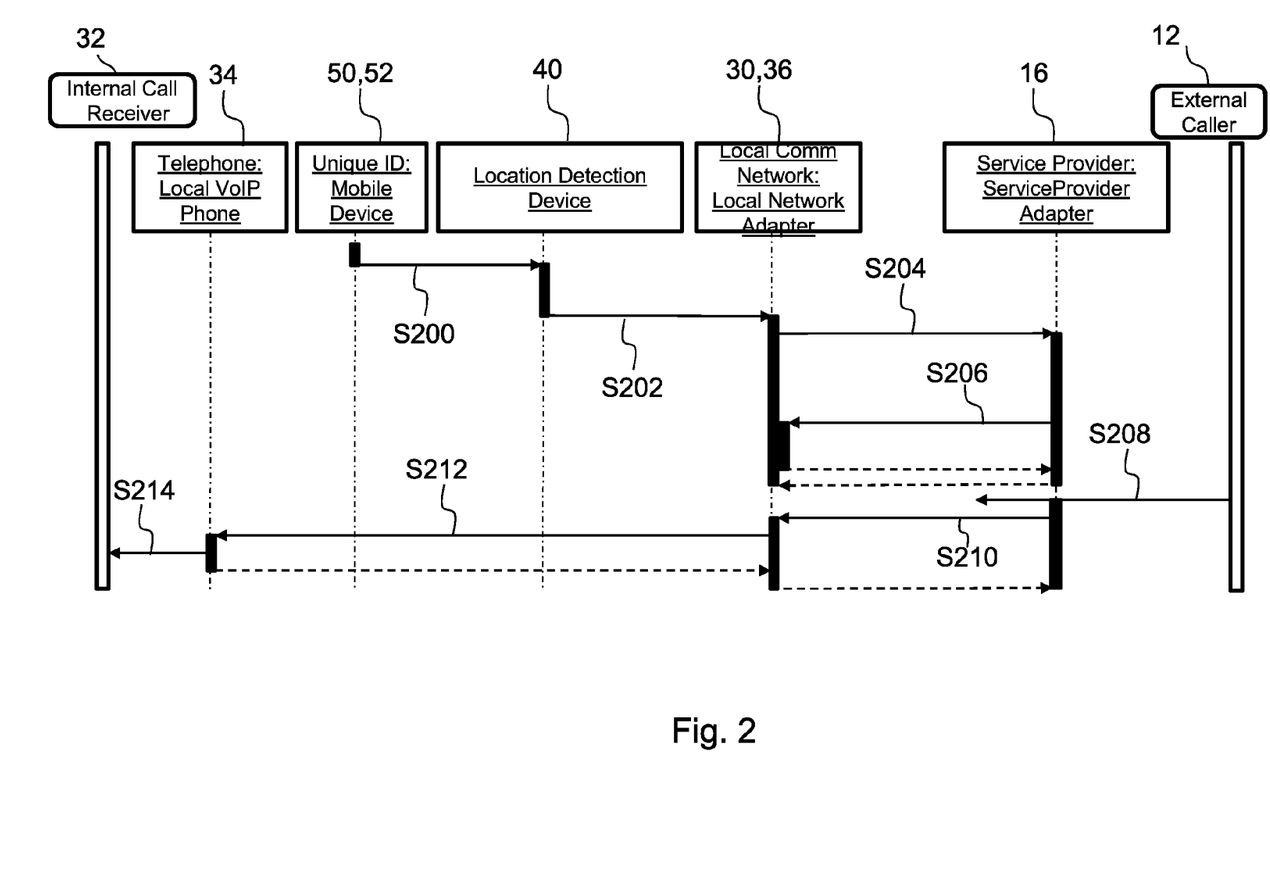
FIG. 2 depicts a state transition diagram of the method according to an embodiment of the invention for establishing a communication session between a first communication device in a main communication network and a second communication device in a local communication network.

FIG. 2 depicts a state transition diagram of the method according to an embodiment of the invention for establishing a communication session between a first communication device 12 in a main communication network 10 and a second communication device 32 in a local communication network 30.

For clarity of the description, referenced numerals, not marked in FIG. 2, are referring to components displayed in FIG. 1. The same applies to the descriptions of the following FIGS. 3 to 5.

The location detection of the current location of the mobile device 50 in an area which is covered by the local communication net 30 starts by, e.g., broadcasting a probe packet comprising the unique identifier 52, being part of the wireless network adapter of the mobile device 50, which is received by the location detection device 40 in operation S200. Next, in operation S202, the location detection device 40 processes the probe packet registering the mobile device 50 by its unique identifier 52. The current location of the mobile device 50 in the area which is covered by the local communication network 30 may be determined and thus the presence of the mobile device 50 notified to the local network adapter 36. The local network adapter 36 notifies in operation S204 the unique identifier 52 and the local communication identifier 44 via the Internet 60 to the service provider adapter 16, which then looks in its lookup table 18 for the corresponding user. A temporary local network identifier 46 is set up by the service provider adapter 16 in which the user is registered with the mobile device 50 for normal usage.

An external phone number 24 is looked up for the identified user and then a phone routing is set up for the external phone number 24 to the temporary local network identifier 46. The temporary local network identifier 46 is sent to the local network adapter 36 in operation S206 and registered over there. The local network adapter 36 determines the closest phone 32 through the location of the mobile device 50 and sets up a phone routing for a local network identifier 48 to this closest phone 32. Thus the location detection of the mobile device 50 as well as the routing of the external phone number 24 to the closest suitable communication device 32, e.g. a telephone, in the vicinity of the mobile device 50 is completed.

If an external caller dials the external phone number 24 in operation S208, the service provider adapter 16 initiates the temporary local network identifier 46 sending it through the internet 60 to the local network adapter 36 in operation S210. The local network adapter 36 initiates the local network identifier 48 communicating it to the local VoIP telephone system 34, which causes the second communication device 32, e.g. an analogue telephone, to ring. Thus the phone call from the external caller is routed through to the internal call receiver, who remains anonymous to the local communication network 30.

Following an example of an implementation of the major processes for establishing the communication session from a first communication device 12 in a first communication network 10 to a second communication device 32 in a local communication network 30 is given.

For example, when the local network adapter 36 detects a unique identifier 52, it sends to the service provider adapter 16 a notification that, e.g., a unique identifier 52 named beacon 123 is detected. The service provider adapter 16 answers by registering a local communication identifier 44 at the local communication network 30:
→REGISTER sip:beacon123@serviceprovider.com SIP/2.0
←401 Unauthorized
→REGISTER sip:beacon123@serviceprovider.com SIP/2.0
AUTHORIZATION DATA
←200 OK The routing setup of a phone number to a local network identifier 44 is carried out using the temporary SIP (session initiation protocol, a protocol for VoIP technology) identifier (beacon123@).

When a call arrives at the service provider, first a corresponding user is looked up based on the call phone number. Then a local communication identifier 44 is looked up based on the user and finally an SIP connection is established with the local communication network 30 using the temporary SIP identifier:
→INVITE sip:beacon123@serviceprovider.com Session Initiation Protocol (SIP)/2.0
Transmission Control Protocol (TCP)
Via: SIP/2.0/TCP protocol.converter.com:5060; branch=z9hG4bK74bf9
Max-Forwards: 70
From: 0123456789<sip:0123456789@pstn.com>; tag=9fxced76s1
To: beacon123<sip:beacon123@serviceprovider.com>
←100 Trying
←100 Ringing
←200 OK
→acknowledgment (ACK)
DATA PACKETS The protocol converter 22 may be used for this process.

Figure 3:
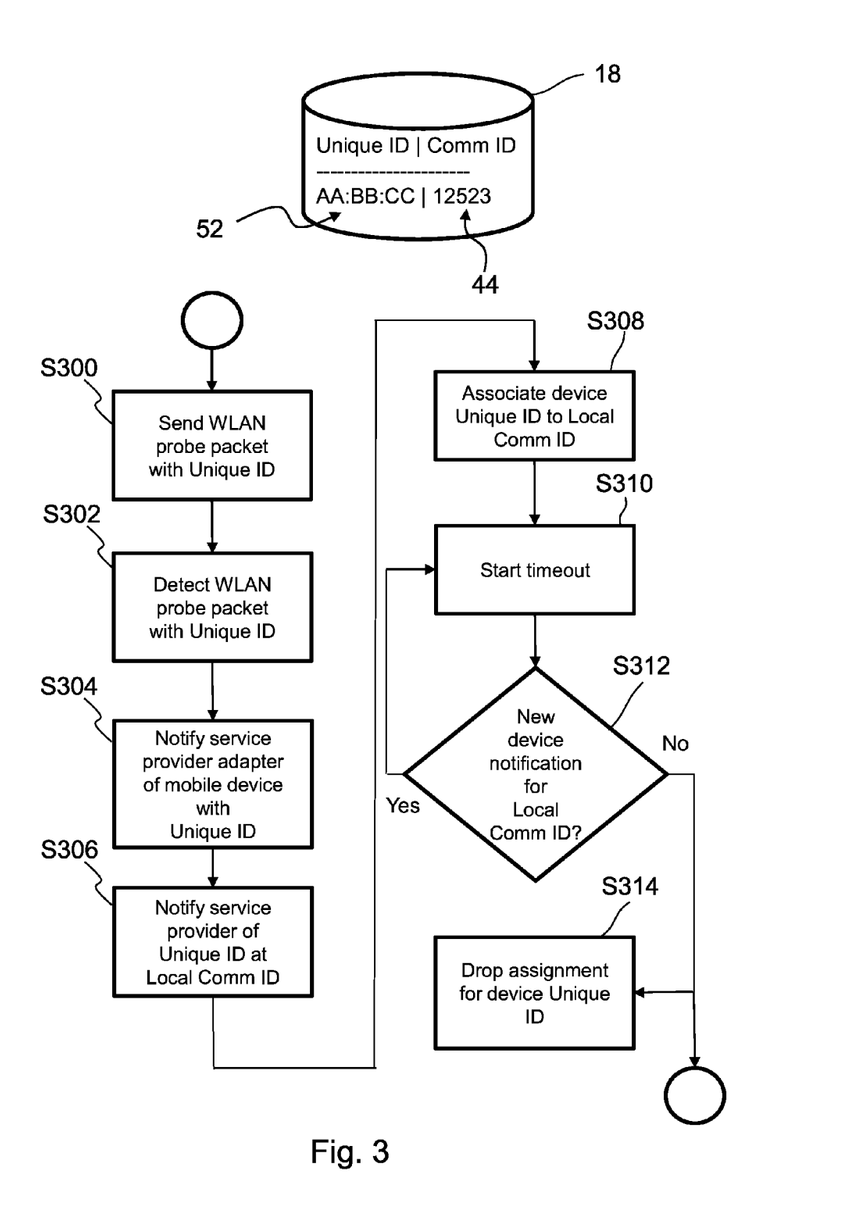
FIG. 3 depicts a flowchart of the notification of the mobile device to the service provider according to an embodiment of the invention.

When the call arrives in the local communication network 30 the unique identifier 52 is looked up based on the incoming temporary SIP identifier. The closest telephone location to the corresponding mobile device 50 is looked up. Next the call routing may be setup based on the internal telephone structure, looking for an open line. The incoming SIP connection is then accepted and connected to the open line:
→INVITE sip:beacon123@serviceprovider.com SIP/2.0
Via: SIP/2.0/TCP protocol.converter.com:5060; branch=z9hG4bK74bf9
Max-Forwards: 70
From: 0123456789<sip:0123456789@pstn.com>; tag=9fxced76s1
To: beacon123<sip:beacon123@serviceprovider.com>
←100 Trying
←100 Ringing
←200 OK
→ACK
DATA PACKETS FIG. 3 depicts a flowchart of the notification of the mobile device 50 to the service provider according to an embodiment of the invention. In operation S300 the mobile device 50 sends a probe packet comprising the unique identifier 52 via WLAN 38, being detected by the location detection device 40 in operation S302 as the unique identifier 52 of the mobile device 50. Next the service provider adapter 16 is notified of detection of the mobile device 50 with the unique identifier 52 at a VoIP service with the local communication identifier 44 in operation S306. There the unique identifier 52 may be assigned to the local communication identifier 44 by the service provider adapter 16 in operation S308. A timeout process is started in operation S310 by the service provider, regularly checking for a new device notification for the local communication identifier 44 in operation S312. If there is no new device notification the process finally stops and the assignment for the unique identifier 52 is dropped in operation S314.

Figure 4:
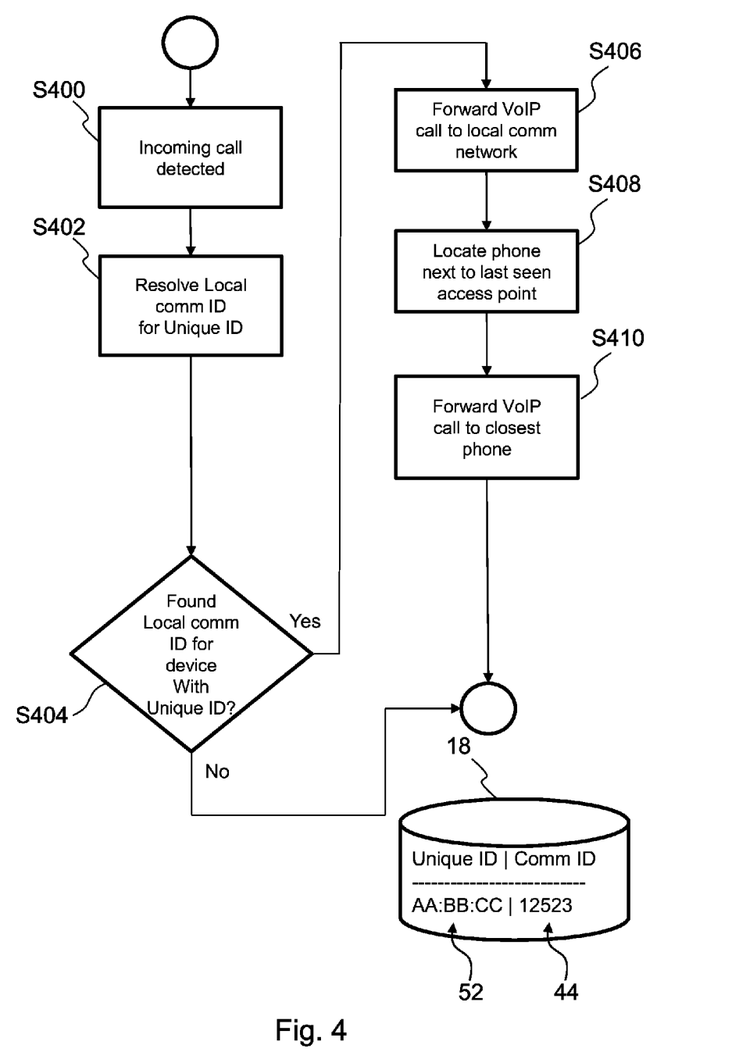
FIG. 4 depicts a flowchart of the forwarding of an incoming telephone call from the service provider to the second communication device according to an embodiment of the invention.

FIG. 4 depicts a flowchart of the forwarding of an incoming telephone call from the service provider to the second communication device 32 according to an embodiment of the invention. In operation S400 an incoming call for the external phone number 24 is detected by the service provider. Next the local communication identifier 44 for the unique identifier 52 is resolved by the service provider adapter 16 in operation S402 from the assignment of the unique identifier 52 to the local communication identifier 44 stored in the lookup table 18 of the service provider. If a local communication identifier 44 is found in operation S404 the call is forwarded in operation S406 to the local communication network 30 which may be implemented as a VoIP infrastructure. The telephone next to the mobile device 50 may be located in operation S408 by the local network adapter 36 in the local lookup table 42, wherein the telephone is characterized by its local network identifier 48. Next, in operation S410, the call is forwarded to this telephone 32 and the user of the mobile device 50 as the call receiver may be receiving the call. If there is no local communication identifier 44 found to be assigned to the unique identifier 52 in the lookup table 18 in operation S404, the process comes to an end.

Figure 5:
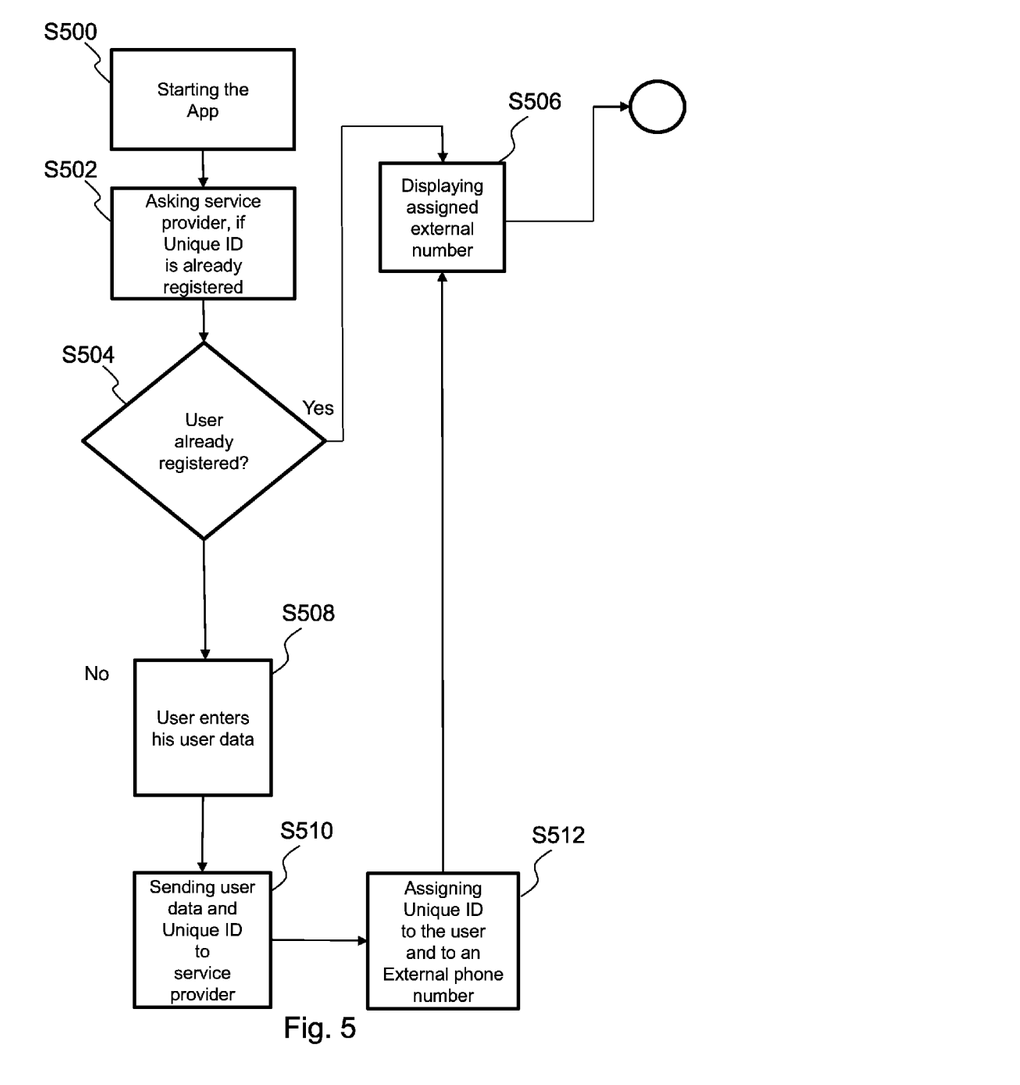
FIG. 5 depicts a flowchart of registering a new user to the service provider according to an embodiment of the invention.

FIG. 5 depicts a flowchart of registering a new user to the service provider according to an embodiment of the invention. The process starts in operation S500 by starting a program, e.g. an application (app) on the mobile device 50. The service provider is then asked in operation S502, if a specific unique identifier 52 is already registered. In operation S504 it is checked if the user with this unique identifier 52 is already registered. If this is the case the assigned external phone number 24 is displayed in operation S506. If the user is not yet registered, then the user continues by entering his data in operation S508, followed by sending the user data and the unique identifier 52 to the service provider. In operation S512 the unique identifier 52 is assigned to the user as well as to an external phone number 24. Finally the process continues by displaying the assigned external phone number 24 in operation S506, before the process coming to an end.

Figure 6:
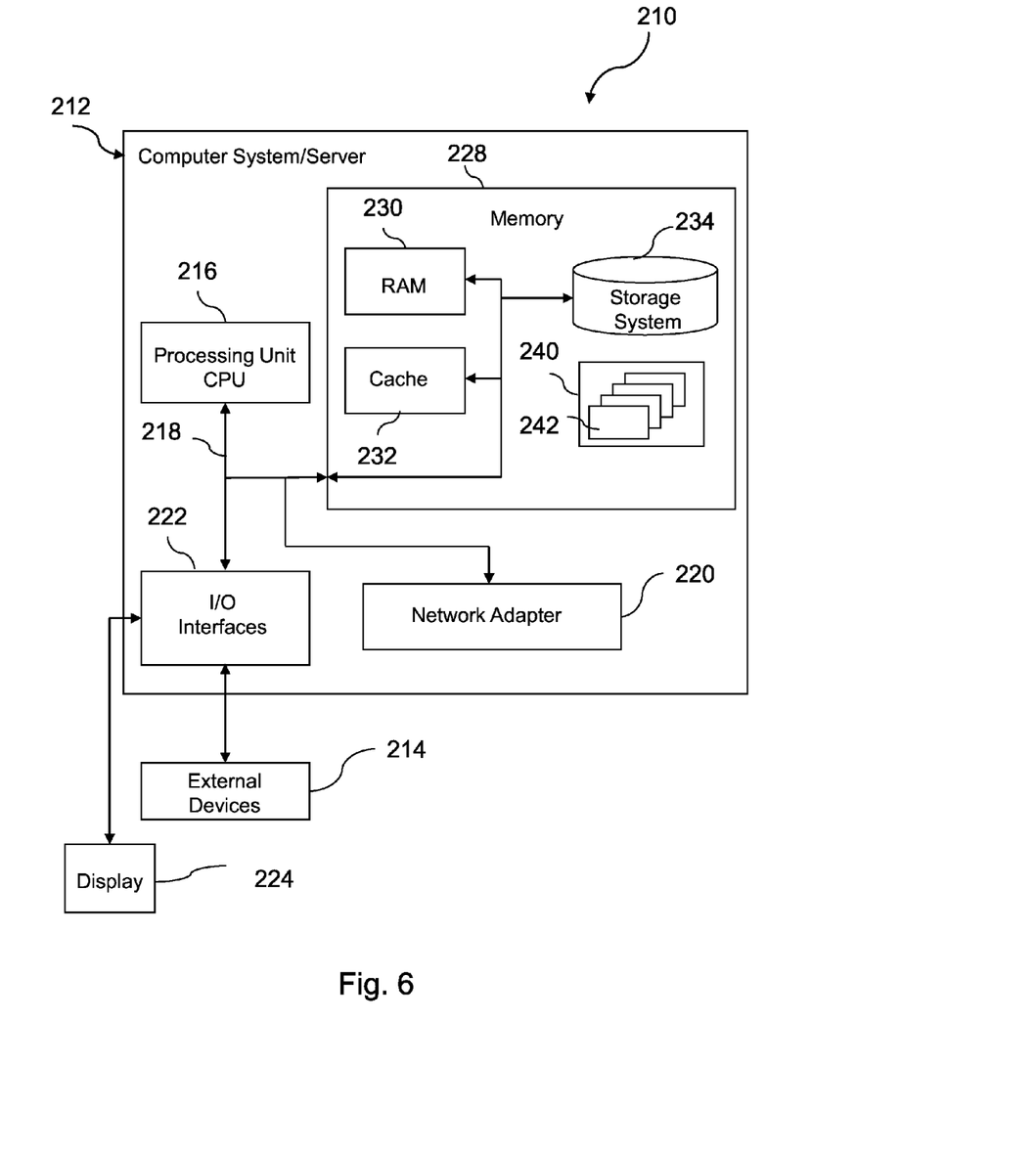
FIG. 6 depicts an example embodiment of a data processing system for executing a method according to the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a local area network (LAN), a first broadcast, from a mobile phone, of a unique identifier associated with a secondary phone number assigned to the mobile phone by a service provider, wherein the mobile phone also has an assigned main phone number through which the mobile phone can send and receive telephone calls via a cellular network associated with the service provider, and wherein the first broadcast is one of a plurality of periodic broadcasts sent by the mobile phone while the mobile phone is located in an area where the main phone number is unreachable via the cellular network;

notifying, by the LAN and in response to the first received broadcast, the service provider of the unique identifier and an identifier of the LAN such that the service provider is able to associate the unique identifier with the LAN identifier in a first table;

detecting, by the LAN and based on the plurality of periodic broadcasts, a plurality of locations of the mobile device as it moves about the area;

selectively updating, based on the detected locations and by the LAN, an association in a second table of the unique identifier with a plurality of telephones in a telephone network connected to the LAN, such that the unique identifier is continually associated, in the second table, with a single telephone of the telephone network that is physically closest to a most-recently detected location of the plurality of locations of the mobile phone;

receiving, by the LAN and based on the service provider receiving an incoming call to the secondary phone number and resolving, in the first table, the unique identifier to the LAN identifier, the incoming call from the service provider; and forwarding, in response to the receipt of the incoming call from the service provider and based a current status of the association of the unique identifier in the second table, the incoming call from the service provider to a telephone in the telephone network that is currently the physically closest telephone in the telephone network to the mobile phone.

* * * * *